United States Patent Office 3,487,085
Patented Dec. 30, 1969

3,487,085
DIHYDROTHIENO BENZOTHIEPENE
Miroslav Protiva, Miroslav Rajsner, and Jirina Metysova, Prague, Czechoslovakia, assignors to SPOFA, Spojene podniky pro zdravotnickou vyrobu, Prague, Czechoslovakia
No Drawing. Filed Aug. 22, 1966, Ser. No. 573,860
Claims priority, application Czechoslovakia, Aug. 25, 1965, 5,251/65
Int. Cl. C07d 99/06; A61k 27/00
U.S. Cl. 260—268        5 Claims

ABSTRACT OF THE DISCLOSURE

A heterocyclic amine selected from the group consisting of a base having the formula

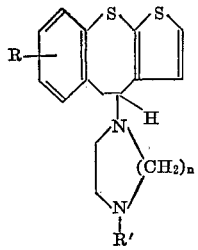

and a non-toxic acid addition salt thereof wherein R is selected from the group consisting of hydrogen and halogen, R' is a member selected from the group consisting of alkyl, hydroxyl alkyl, acyl derived from a carboxylic acid and alkoxycarbonyl, the radicals of said latter group having from 1 to 4 carbon atoms and wherein $n$ is 2 or 3.

The compounds have a high central nervous system sedative action. They furthermore possess anti-spasmodic, antihistaminic, antiemetic and antiserotonine properties.

---

The present invention relates to certain new heterocyclic amines and to a method of compounding and using the same. More particularly, the invention relates to a new class of heterocyclic amines having the formula

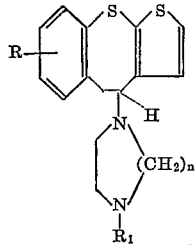

and the non-toxic salts thereof, wherein R is hydrogen or halogen, R' is alkyl, hydroxyalkyl, acyl or alkoxycarboxyl having 1 to 4 carbon atoms, and $n$ is 2 or 3.

The new compounds of this invention are useful chemotherapeutic agents particularly because of their neurotropic and psychotropic activity. They exhibit a particularly marked central sedative effect. In addition they possess anti-spasmodic, antihistaminic, antiemetic, and antiserotonine properties. Further they have a potentiating action on other pharmacological agents, such as narcotics, hypnotics, analgesics and local anesthetics.

The term "salts" as used herein is intended to include all non-toxic of pharmacologically acceptable salts of the basic compounds, including both the acid addition salts and the quaternary ammonium salts.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butylchloride, isobutyl chloride, benzylchloride and bromide; phenethyl bromide, naphthylmethyl chloride, dimethyl sulfate, diethylsulfate, methyl benzenesulfonate, ethyl toluenesulfonate, ethylene chlorohydrin, propylene chlorohydrin, alkyl bromide, methallyl bromide and crotyl bromide.

The compounds of this invention are preferably prepared by a reaction between an ester of an alcohol of the formula:

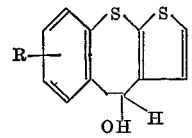

(II)

wherein R is as above defined and an inorganic or organic acid such as hydrochloric acid, alkyl or aryl sulfonic acid and the product formed reacted with a secondary amine having the formula

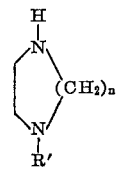

(III)

wherein R' and $n$ are as above defined.

The reaction is suitably carried out by connecting the alcohol II into its corresponding halide and preferably chloride as for instance by reacting the alcohol II with anhydrous hydrogen chloride in an inert solvent medium and reacting the crude halide formed without isolation, but following evaporation of the solvent, i.e. benzene with the secondary amine III i.e. with N-methylpiperazine or a homolog or analog thereof.

The reaction is usually carried out in an inert solvent of the hydrocarbon type such as benzene.

The acid addition salts may be suitably prepared directly from the reaction mixture by acidifying with dilute acids such as hydrochloric acid. The alkyl halide quaternary salts are suitably prepared by treating the base in an anhydrous solvent medium with an excess of the alkyl halide and recrystallizing the product from ethanol.

The following examples are given in order to more clearly disclose the nature of the present invention. It should be understood however, that the examples are not intended to be a limitation on the scope of the invention.

Example 1

A solution of 3.6 g. 4 - hydroxy - 4,5-dihydrothieno (2,3-b)-benzo(f)thiepine in 36 ml. anhydrous benzene was saturated for 1 hour with dry hydrogen chloride. The solution thereby obtained was dried using anhydrous calcium chloride, and the benzene evaporated at reduced pressure. The residue was then mixed with 5 ml. N- methylpiperazine and the mixture heated for 2 hours to 120° C. Following cooling it was diluted with 70 ml. water, and the product extracted with chloroform. The extract was washed with water, and the base extracted therefrom into dilute hydrochloric acid (1:9) by shaking. The acidic solution of the hydrochloride was filtered in the presence of decolorizing charcoal, and the base re-liberated with concentrated aqueous ammonia, extracted once more with chloroform, and the extract dried and evaporated. The evaporation residue was crystallized from cyclohexane. There was thereby obtained 2.2 g. 4-(4-methylpiperazino) - 4,5 - dihydrothieno(2,3-b)benzo(f)-thiepine, having a melting point of 141–142° C.

The base was treated with maleic acid solution in boiling ethanol. After cooling of the solution there was obtained, the crystalline maleate having a melting point of 164–166° C. (ethanol-ether).

Example 2

Analogous to Example 1, there were prepared from 3.6 g. 4-hydroxy - 4,5 - dihydrothieno(2,3-b)benzo(f) thiepine, the corresponding crude 4 - chloro - derivative, which was mixed with 7.5 ml. N-(2-hydroxyethyl)piperazine. The resulting mixture was first heated for 2 hours at 100° C., and then for another 1 hour at 130° C. After cooling, the mixture was diluted with 100 ml. water, and the product extracted with chloroform. The extract was thoroughly washed with water. The base thereby obtained was transferred into dilute hydrochloric acid. By further processing, as set out in Example 1, there was obtained substantially pure 4 - [4 - (2 - hydroxyethyl) piperazino] - 4,5 - dihydrothieno(2,3 - b)-benzo(f)thiepine, which was converted by treatment with maleic acid into the crystalline maleate. The maleate was refined by recrystallization out of ethanol-ether mixture.

Example 3

Crude 4 - chloro - 4,5 - dihydrothieno(2,3-b)-benzo (f)thiepine was prepared analogously to Example 1 from 3.6 g. of the 4-hydroxy derivative. The 4-chloro-4,5-dihydrothiene(2,3-b)benzo(f)thiepine was then mixed with 7.6 ml. N - (ethoxycarbonyl)piperazine, the mixture allowed to stand at room temperature for 12 hours, and then heated for 3 hours to 120° C. Following cooling it was diluted with 100 ml. water, and extracted with chloroform. The chloroform extract was processed as set out in the foregoing examples. There was obtained 4-[4-(ethoxycarbonyl)piperazino] - 4,5 - dihydrothieno(2,3 - b) benzo(f)thiepine. On treatment of the thiepine with maleic acid the crystalline maleate was obtained. The salt was purified by crystallization from an ethanol-ether mixture.

The starting component, i.e., 4 - hydroxy-4,5-dihydrothieno - 2,3 - b)benzo(f)thiepine was prepared by the following procedure:

6 g. pulverous copper were added to a solution of 190 g. potassium hydroxide in 2 litres water. Thereafter 116.2 g. 2-mercaptothiophene was added in dropwise fashion in a nitrogen atmosphere with stirring to the mixture. Under continued stirring, 248 g. 2-iodobenzoic acid was added, and the mixture boiled in a nitrogen atmosphere for 6 hours under reflux. Following cooling it was filtered and the filtrate acidified while stirring with concentrated hydrochloric acid. The product which separated out was separated with suction, thoroughly washed with water, and dried. There were obtained 224 g. 2-(2-thienylthio) benzoic acid having a melting point of 194–196° C. The compound as obtained was sufficiently pure to be used without further processing.

To a suspension of 24 g. lithium-aluminum hydride in 2.5 litres absol. ether 100 g. of 2-(2-thienyl thio) benzoic acid were added in small increments in the course of 2 hours, with stirring. The resultant mixture was boiled for 1 hour under reflux, and after having been cooled down it was carefully decomposed first with water, and then with dilute hydrochloric acid. The ethereous layer was separated off, washed with a 3%-sodium hydroxide solution, and dried with magnesium sulfate. After distilling off the ether, the residue remaining was redistilled in vacuo. There were obtained 79.5 g. 2-(2-thienylthio)benzyl alcohol having a boiling point of 145–147° C./0.4 torr. The product crystallized on standing, and had a melting point of 36–38° C.

9.5 ml. thionyl chloride was added in dropwise fashion to a solution of 25.1 g. 2-(2-thienylthio)benzyl alcohol in 11 ml. anhydrous pyridine under external cooling with ice and stirring at a rate whereby the temperature of the mixture did not exceed 35° C. The mixture was then stirred at room temperature for 2.5 hours, and left to stand overnight. It was thereafter diluted with 100 ml. benzene, and the resulting solution washed first with 50 ml. water, and then with 50 ml. dilute hydrochloric acid (1:10), dried with sodium sulfate and evaporated at reduced pressure. The residue comprised the crude 2-(2-thienylthio)benzyl chloride which was thusly formed in an almost theoretical yield, which could be used in its actual condition without further workup. For purification it could be redistilled in vacuo, which results however in heavy losses due to partial decomposition. The pure product has a boiling point of 145–155° C./0.4 torr, solidifying to a crystalline substance having a melting point of 59–61° C. (cyclohexane).

A mixture of 6.0 g. 2-(2-thienylthio)benzyl chloride, 2.2 g. potassium cyanide, 5 ml. water and 10 ml. ethanol was boiled for 8 hours with stirring and under reflux. The mixture was then diluted with water, and the oily product extracted with ether. The extract was dried with sodium sulfate, and evaporated. The residue crystallized on standing, and was purified by crystallization from ethanol. There was obtained 5.0 g. 2-(2-thienylthio)benzyl cyanide having a melting point of 65–67° C.

A mixture of 5.0 g. 2-(2-thienylthio)benzyl cyanide, 12 ml. ethanol, 5.0 g. potassium hydroxide and 6 ml. water was boiled with stirring under reflux for 3 hours. After cooling it was diluted with 80 ml. water. The turbid solution thus formed was washed with chloroform, filtered, and the filtrate acidified with concentrated hydrochloric acid. There was separated out an oily product, solidifying slowly on standing to a crystalline form. Following separation using suction, washing with water and drying, 3.8 g. 2-(2-thienylthio)phenylacetic acid were obtained, which on recrystallizing from a benzene-petroleum ether mixture had a melting point of 121–123° C.

A mixture of 2.5 g. 2-(2-thienylthio)phenylacetic acid, 16 ml. anhydrous toluene, and 3.3 g. phosphorous pentoxide, was boiled under reflux for 4.5 hours. The toluene-containing solution was decanted while still warm from the dark substance clinging to the walls of the vessel, which was washed twice with a little quantity of additional toluene. The toluene solutions were combined, washed with a 10%-sodium hydroxide solution, dried with anhydrous potassium carbonate, and evaporated at reduced pressure. The residue (1.9 g.) crystallizes on standing and was purified by recrystallization from ethanol. There was thusly obtained 4,5-dihydrothieno(2,3-b) benzo(f)thiepin - 4 - on having a melting point of 122–125° C.

A mixture of 8.0 g. of the said 4,5-dihydrothieno(2,3-b)benzo(f)thiepin-4-on, 80 ml. ethanol, and 1.5 g. sodium borohydride was stirred and heated until the latter was dissolved. The solution was allowed to stand for 3 hours at room temperature, and the ethanol was then evaporated at reduced pressure. The evaporation residue was taken up in water and chloroform. The chloroform extract was dried with anhydrous potassium carbonate, and evaporated. On recrystallizing the evaporation residue from 30 ml. cyclohexane there were obtained 6.6 g. of pure 4-hydroxy - 4,5 - dihydrothieno(2,3 - b)benzo(f) thiepine having a melting point of 101–103° C.

The compounds can be administered in therapeutic dosages in conventional vehicles as in the form of a tablet as these compounds are effective upon oral administration as well as upon injection. The compounds of the invention can also be used parenterally. Injectable solutions can be prepared by dissolving the compound in the selected medium to which preservatives can be added if desired.

What is claimed is:
1. A heterocyclic amine selected from the group consisting of a base having the formula

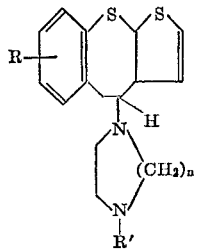

and a non-toxic acid addition salt thereof wherein R is selected from the group consisting of hydrogen and halogen, R' is a member selected from the group consisting of alkyl, hydroxy alkyl, acyl derived from a carboxylic acid and alkoxycarbonyl, the radicals of said latter group having from 1 to 4 carbon atoms and wherein $n$ is 2 or 3.

2. The heterocyclic amine of claim 1 which is 4-(4 - methylpiperazino) - 4,5 - dihydrothieno(2,3 - b) benzo(f)thiepine.

3. The heterocyclic amine of claim 1 which is 4-[2-hydroxyethyl)piperazino] - 4,5 - dihydrothieno(2,3 - b) benzo(f)thiepine.

4. The heterocyclic amine of claim 1 which is 4-[4-(ethoxycarbonyl)piperazino] - 4,5 - dihydrothieno(2,3-b)benzo(f)-thiepine.

5. The heterocyclic amine of claim 1 wherein said salt is a maleate.

References Cited

UNITED STATES PATENTS

| | | | |
|---|---|---|---|
| 3,167,541 | 1/1965 | Van der Stelt | 260—239 |
| 3,257,404 | 6/1966 | Fouche | 260—268 |
| 3,306,897 | 2/1967 | Renz et al. | 260—268 X |
| 3,357,982 | 12/1967 | Van der Stelt | 260—268 |

FOREIGN PATENTS 1,413,978 9/1965 France.

DONALD G. DAUS, Primary Examiner

U.S. Cl. X.R.

260—239, 329, 332.2, 332.3; 424—250